US006960016B2

(12) United States Patent
Apothéloz et al.

(10) Patent No.: US 6,960,016 B2
(45) Date of Patent: Nov. 1, 2005

(54) WRISTBAND OR BRACELET ADJUSTABLE IN LENGTH, IN PARTICULAR A WATCHBAND, INCLUDING AN ELECTRICAL CONDUCTOR EMBEDDED IN ITS THICKNESS

(75) Inventors: David Apothéloz, Corcelles (CH); Nicolas Oian, St-Blaise (CH); Nicolas Clerc, Le Locle (CH)

(73) Assignee: The Swatch Group Mangement Sevices AG, Biel (CH)

( * ) Notice: Subject to any disclaimer, the term of this patent is extended or adjusted under 35 U.S.C. 154(b) by 0 days.

(21) Appl. No.: 10/891,526

(22) Filed: Jul. 15, 2004

(65) Prior Publication Data

US 2005/0011918 A1 Jan. 20, 2005

(30) Foreign Application Priority Data

Jul. 15, 2003 (EP) .......................................... 03016050

(51) Int. Cl.[7] ......................... G04B 37/00; A44C 5/00; H01Q 1/12; H04B 1/06

(52) U.S. Cl. ...................... 368/282; 224/165; 343/718; 343/720; 455/344

(58) Field of Search ........................... 368/10, 47, 281, 368/282; 224/165; 343/718, 720; 455/344

(56) References Cited

U.S. PATENT DOCUMENTS

| | | | | |
|---|---|---|---|---|
| 4,303,109 A | | 12/1981 | Cohen | |
| 4,754,285 A | * | 6/1988 | Robitaille | 343/718 |
| 5,014,040 A | | 5/1991 | Weaver et al. | |
| 5,134,724 A | * | 7/1992 | Gehring et al. | 455/274 |
| 5,135,694 A | | 8/1992 | Akahane et al. | |
| 5,152,693 A | * | 10/1992 | Matsui et al. | 439/37 |
| 5,526,006 A | | 6/1996 | Akahane et al. | |
| 6,619,835 B2 | * | 9/2003 | Kita | 368/281 |

FOREIGN PATENT DOCUMENTS

| | | |
|---|---|---|
| CH | 604 597 | 9/1978 |
| EP | 125 930 A2 | 11/1984 |
| EP | 126 629 A2 | 11/1984 |
| WO | WO 86/03645 A1 | 6/1986 |

* cited by examiner

*Primary Examiner*—Vit W. Miska
(74) *Attorney, Agent, or Firm*—Sughrue Mion, PLLC

(57) ABSTRACT

There is disclosed a wristband for a portable electronic instrument including at least a first wristband strand (50) including outer and inner faces and one end (50A) of which is intended to be fixed to a case of a portable electronic instrument, this first wristband strand (50) including, housed between said outer and inner faces, an electric conductor including a conductive plate (10) of elongated shape arranged longitudinally in said first wristband strand (50). The conductive plate (10) includes a plurality of electric contact zones (30) with the conductive plate (10) distributed longitudinally over the first wristband strand, the first wristband strand (50) being arranged to be cut with the conductive plate (10) along several transverse cutting lines arranged in each portion located between two adjacent electric contact zones (30).

20 Claims, 3 Drawing Sheets

10A
10
30
21
20
10B 10A
12
10
20
21
30
10B 50A
500
50
51
55
50B 10A
12
10
21
30
20
10B

CROSS-SECTION A-A 50A
500
10A
A
12
52
50
56
10
20
55
30
50B
10B
21
51

CROSS-SECTION B-B
82b
61
82
51
10
82a
81a
20
21
80
81
50
60
81b
61

50A
500
50
51
21
55
81b
50B
60
61

50A
500
500
50
50B
B
B
82b
81b
60
61
61

WRISTBAND OR BRACELET ADJUSTABLE IN LENGTH, IN PARTICULAR A WATCHBAND, INCLUDING AN ELECTRICAL CONDUCTOR EMBEDDED IN ITS THICKNESS

The whole content of priority document EP Patent Application No. 03016050.1 filed on Jul. 15, 2003 by the Assignee is incorporated herein by reference.

FIELD OF THE INVENTION

The present invention generally concerns a wristband for a portable electronic instrument including at least a first wristband strand including outer and inner faces and one end of which is intended to be fixed to a case of the portable electronic instrument, this first wristband strand including, housed between said outer and inner faces, an electric conductor including a conductive plate of elongated shape arranged longitudinally in the first wristband strand.

BACKGROUND OF THE INVENTION

Wristbands incorporating electric conductors are already known. EP Patent Applications No. 0 125 930 and No. 0 126 629 disclose for example a wristband answering the general definition given hereinbefore, the electric conductor incorporated in the wristband being used to assure an electric connection with a component placed in the wristband (for example a battery) or to form a loop antenna around the wrist. In this latter case, in particular, each strand of the wristband is provided with an electric conductor one end of which is connected to the case of the electronic instrument and the other end of which is connected to corresponding end of the other strand via a wristband fastening device, the latter being itself electrically conductive. Other examples are known. WO Patent Application No. 86/03645 for example, proposes a solution wherein the wristband fastening device can be of the type including a buckle with a tongue or of the type with male and female parts that plug into each other. U.S. Pat. Nos. 5,135,694 and 5,526,006 propose a solution wherein the position of the wristband fastening device can be adjusted on one of the wristband strands, this wristband strand including several zones distributed longitudinally on the inner face of the wristband where the electric conductor is exposed and to which the wristband fastening device is electrically connected. These documents also propose a solution for manufacturing the wristband, which consists in providing one or several extensions on the conductive plate for holding the plate in a mould during an operation of overmoulding a synthetic material around the conductive plate, the extension or extensions being provided to be broken after overmoulding.

In the aforementioned solutions, in order to assure electric contact with the conductive plate while allowing the length of the wristband to be adjusted, it will be noted that parts of the conductor are exposed to allow contact elements arranged on the wristband fastening device to be directly applied against the conductive plate. This type of solution has a drawback insofar as the exposed parts of the conductive plate can quickly be oxidised and thus cause a deterioration in the quality of the electric contact. Such oxidisation is accelerated, in particular, by the presence of sweat when the wristband is worn on the wrist. From an aesthetic point of view, this type of solution is also undesirable.

Another drawback of these solutions lies in the relatively large thickness of the wristband around the fastening device, the two wristband strands being superposed there. Finally, this type of solution limits the possibilities for manufacturing the wristband fastening device.

SUMMARY OF THE INVENTION

It is a general object of the present invention thus to propose a solution assuring adequate electric contact with the electric conductor that is incorporated in the wristband and also enabling the length of the wristband to be adjusted. It is a particular object to assure adequate electric contact with a wristband fastening device that is itself a conductor, particularly for connecting two electric conductors incorporated in each of the wristband strands in order to form a loop conductor adjustable in length around the user's wrist and able to operate like a loop antenna.

The present invention thus concerns a wristband for a portable electronic instrument of the aforementioned type whose features are listed in claim 1.

Advantageous embodiments of the present invention form the subject of the dependent claims.

It is thus proposed to arrange a plurality of electric contact zones with the conductive plate, which is incorporated in the wristband, these electric contact zones being distributed longitudinally on the wristband strand. This wristband strand is also arranged to be cut with the conductive plate along several transverse cutting lines arranged in each portion located between two adjacent electric contact zones.

Preferably transverse markers coinciding with the cutting lines are made on one and/or other of the inner and outer faces of the wristband in order to facilitate the cutting of the wristband strand.

The wristband can advantageously include two identical wristband strands of this type which are attached to each other by a wristband fastening device assuring an electric connection between the conductive plates housed in the wristband strands. Preferably, the wristband strands are arranged to have identical lengths after cutting. This is preferable from an ergonomic and aesthetic point of view. Within the scope of use as an antenna, this is also preferable from an electrical point of view, the wristband fastening device, which is itself also a conductor, being thus arranged in the middle of the wristband. Indeed, this minimises the effects on the tuning of the antenna of any contact between the user's skin and the wristband fastening device.

It will be noted that solutions consisting in adjusting the length of a wristband by cutting a wristband strand are already known. CH Patent No. 604 597 discloses for example a method for fixing a buckle to a wristband strand, which enables the strand to be shortened to a suitable length before fixing the buckle to it by inserting an intermediate metal piece forming a handle-like part in which the bar of the buckle engages. The first wristband strand includes a series of transverse grooves in its lower face whereas the tweezer-shaped intermediate part includes two ribs capable of being engaged in two of the grooves. The strand can thus be cut to the desired length, then the intermediate part can be inserted by engaging it in the two grooves closest to the cut end of the strand. It will be noted, however, that the wristband disclosed in this document does not have any electric conductor in its thickness.

BRIEF DESCRIPTION OF THE DRAWINGS

Other features and advantages of the present invention will appear more clearly upon reading the following detailed description of an embodiment of the invention, given solely by way of non-limiting example and illustrated by the annexed drawings, in which.

DESCRIPTION OF A PREFERRED EMBODIMENT

In the following description, a preferred embodiment of the invention in which the conductor incorporated in the wristband is intended to operate like an antenna element will be described. More specifically, within the scope of this non-limiting example, the wristband includes two identical wristband strands, each including a same conductor, these two strands being attached to each other by a wristband fastening device, which also ensures an electric connection between the two conductors of the wristband strands so as to form a loop conductor around the wrist that operates like a loop antenna. This type of antenna configuration in a wristband is well known and its operating principle will not therefore be explained here. Fuller information on this point can be found in the documents cited in the preamble.

It should, however, be noted that the invention is not limited to an antenna application. The conductor incorporated in the wristband can thus a play another role, such as electrically connecting a component placed on the wristband or capable of being connected to the wristband to another electric or electronic component inside the case of the portable electronic instrument.

Figures 1A, 1B, 1C, 2D:
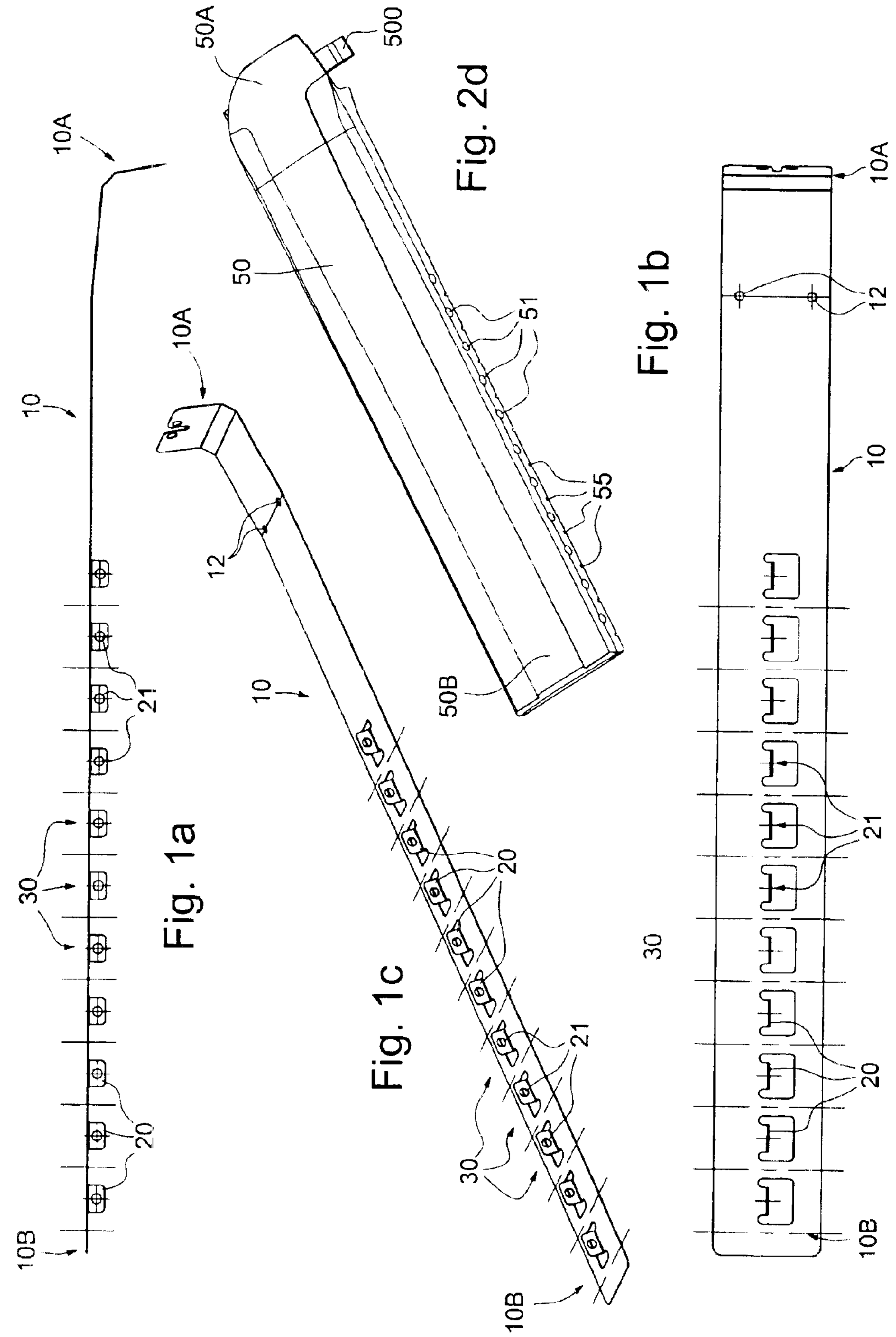
FIGS. 1a, 1b and 1c respectively show a side view, a plan view on the outer face side and a perspective view of a conductive plate forming the electric conductor intended to be incorporated in a wristband strand according to a preferred embodiment of the invention.
FIGS. 2a, 2b, 2c and 2d respectively show a plan view on the inner face side, a lateral cross-section, a plan view on the outer face side and a perspective view of a wristband strand incorporating the conductive plate illustrated in FIGS. 1a to 1c.

FIGS. 1a, 1b and 1c respectively show a side view, a plan view on the outer face side (by definition the "outer face" is defined as the face oriented towards the outside of the wrist when the wristband is being worn, as opposed to the "inner face" which designates the face of the wristband that is in contact with the wrist when the wristband is being worn) and a perspective view of a conductive plate, designated by the reference numeral 10, forming an electric conductor intended to be incorporated in a wristband strand according to a preferred embodiment of the invention. This conductive plate 10 is self-supporting, i.e. it is formed of a plate of an electrically conductive material (for example steel, copper, etc.), which is cut out and bent to the appropriate shape. This conductive plate 10 has an essentially rectangular shape the longitudinal axis of which corresponds to the longitudinal direction of the wristband strand in which said conductive plate 10 is to be incorporated.

In the preferred embodiment, a first end 10A of conductive plate 10 is bent and intended to allow the connection of plate 10 to the corresponding components housed in the case of the portable electronic instrument. This case is not illustrated in the Figures. One only needs to know that the case preferably has a similar configuration to that of a watchcase, end 10a of conductive plate 10 thus being located around the attachment of the wristband strand to the case.

The way in which conductive plate 10 is electrically connected in the electronic instrument is not decisive for the purposes of the present invention. According to the configuration illustrated here by way of non-limiting example, bent end 10A of conductive plate 10 is provided with two orifices for assuring the electric connection of conductive plate 10 via screws to corresponding contact paths or lugs of the case of the portable electronic instrument. On the side of end 10A of plate 10, it will also be noted that there are two orifices designated by the reference numeral 12, the use of which we will return to hereinafter.

In the illustrated example, the other end designated 10B of conductive plate 10 is intended, as already mentioned, to be electrically connected to another identical conductive plate housed in another wristband strand. It is this second end 10B and its configuration that concerns us more specifically within the scope of the present invention.

In FIGS. 1a to 1c, it can thus be seen that conductive plate 10 includes a plurality of lugs 20, here eleven in number, arranged longitudinally along conductive plate 10. These lugs 20 are made by cutting out conductive plate 10 and bending the cut out portions outside the general plane of the conductive plate along a line parallel to the longitudinal direction of the wristband. As will be seen hereinafter in detail, lugs 20 are thus essentially bent at right angles towards one (inner or outer) of the wristband faces. In this particular case, these lugs 20 are bent towards the inner face of the wristband.

As will be seen hereinafter, the plurality of lugs 20 allows several possibilities for roughly adjusting the length of the wristband, the unused end part of the wristband being able to be cut. One could thus envisage that only one of the wristband strands incorporates a plurality of lugs, as illustrated in the Figures and that the other wristband strand has only one.

It will be understood that each lug 20 is intended to allow electric connection to conductive plate 10. Each of these lugs 20 thus defines an electric contact zone with conductive plate 10. In FIGS. 1a to 1c, the eleven contact zones thereby defined are delimited by the dotted lines and are indicated by the reference numeral 30.

Each lug 20 preferably includes a through orifice 21, which is intended to allow electric connection of conductive plate 10 via an electrically conductive pin arranged transversely in the wristband strand between the inner and outer faces of the wristband. These orifices 21 also advantageously allow conductive plate 10 to be held in place via its lugs 20 in a mould during an operation of overmoulding a synthetic material around conductive plate 10. Indeed, during the synthetic material overmoulding operation, conductive plate 10 is held in the mould via one or several of lugs 20 and by the two support points formed by orifices 12. These support points are recommended for ensuring that conductive plate 10 is correctly positioned in the mould during the overmoulding operation.

FIGS. 2a to 2d show the general appearance of the wristband strand (designated by the reference numeral 50) according to the preferred embodiment after the overmoulding operation around conductive plate 10. This conductive plate 10 is added to FIGS. 2a and 2b in order to illustrate its position in the wristband strand after overmoulding. The inner and outer faces of conductive plate 10 are thus totally covered by the synthetic material forming wristband strand 50, with the exception of end part 10A of conductive part 10, which is intended to be electrically connected to the components housed in the case of the portable instrument as already mentioned. It can be seen that this end, designated 50A, of wristband strand 50 is configured to include the means for attaching to the case of the portable instrument. Here they are two protruding parts 500 each provided with a through orifice for the passage of a screw for securing end 50A of wristband strand 50 and the case of the electronic instrument. Any other suitable attachment means can be provided.

Figures 2A, 2B, 2C:
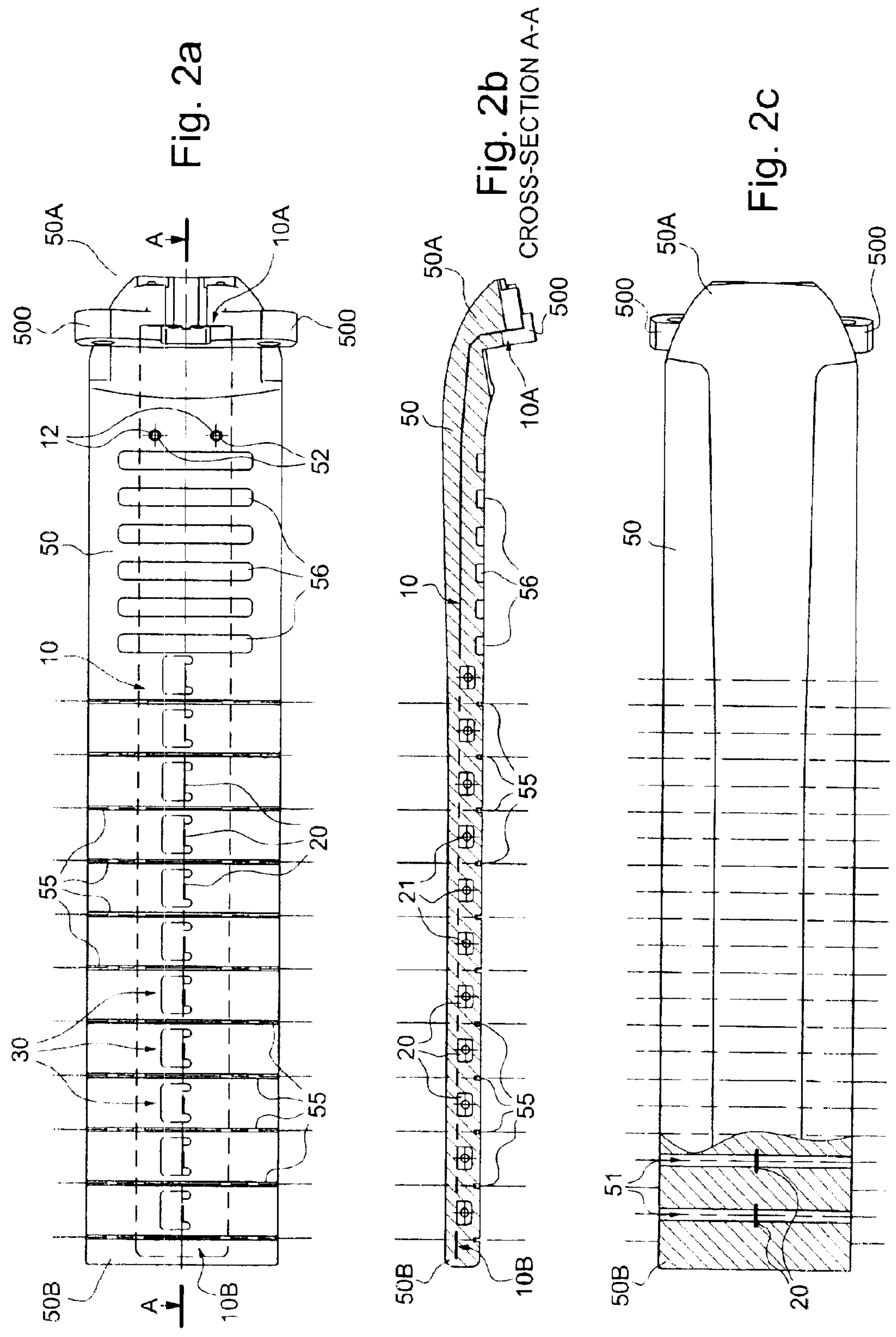

The electric access points to conductive plate 10, on the side of the other end 50B of wristband strand 50, are arranged laterally on the wristband strand. As illustrated in FIGS. 2*c* and 2*d*, it can thus be seen that a plurality of orifices 51, preferably through orifices, are arranged transversely between the inner and outer faces of the wristband strand, in order to allow access to each of lugs 20 of conductive plate 10.

On the inner face of wristband strand 50, as illustrated in FIGS. 2*a* and 2*b*, a set of grooves and/or recesses is provided. A set of transverse grooves 55 is thus made from end 50B of the wristband strand, each of these grooves coinciding with the limits of each electric contact zone 30 with conductive plate 10. These grooves 55 thus play the role of markers for facilitating the cutting out of the wristband in each portion located between two adjacent electric contact zones 30. The markers can be arranged on one and/or the other of the outer or inner faces of the wristband strand. Moreover, instead of grooves, the markers could simply be formed of suitable impressions on one or other of the faces of wristband strands 50.

The set of grooves designated by the reference numeral 56 made on the inner face of wristband strand 50, as illustrated in FIGS. 2*a* and 2*b*, is simply intended to improve the flexibility of the wristband strand on the side of its attachment to the case. On the inner face of wristband strand 50, the presence of two orifices 52, which coincide with orifices 12 arranged in conductive plate 10, will also be noted. These orifices 52 result from conductive plate 10 being held by orifices 12 during the overmoulding operation.

Figures 3A, 3B, 3C:
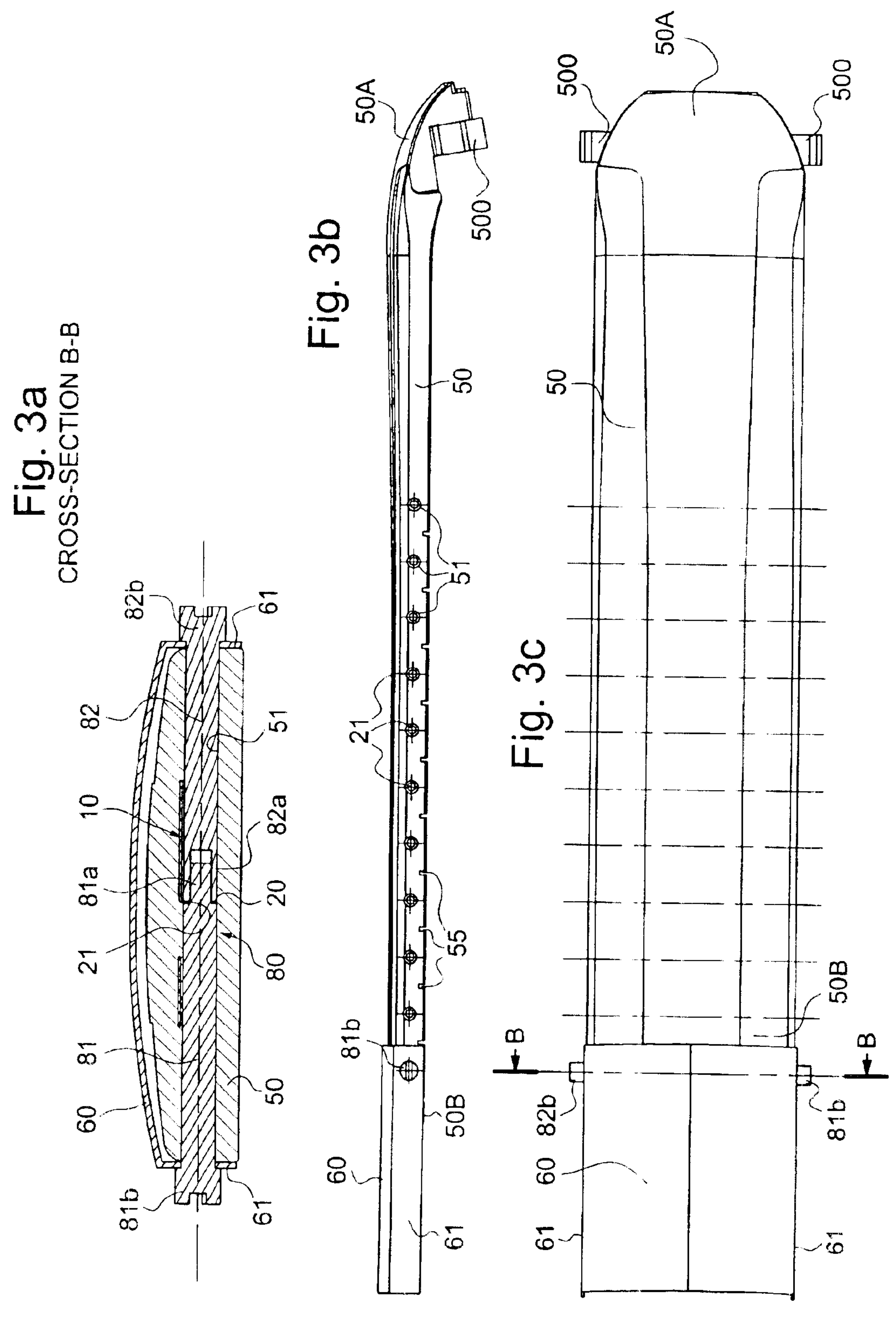
FIGS. 3a, 3b, 3c are respectively a cross-section, a side view and a plan view on the outer face side illustrating the way in which an electric contact between the conductive plate and a wristband fastening device can be achieved according to a preferred embodiment.

Reference will now briefly be made to FIGS. 3*a* to 3*c* to show a preferred embodiment allowing the electric connection of conductive plate 10 via lugs 20. As already mentioned in the preamble, one particularly wishes to electrically connect conductive plate 10 to the other identical conductive plate arranged in the other wristband strand, via a wristband fastening device that is itself a conductor. In FIGS. 3*a* to 3*c*, only a part of such a wristband fastening device has been shown, namely a conventional clasp element designated 60. This may, in particular, be an unfolding buckle clasp or similar.

As illustrated in FIG. 3*a*, element 60 has essentially the shape of a cap made of electrically conductive material provided with two side walls 61, which partly cover the edges of wristband strand 50. The electric connection between element 60 and conductive plate 10 is assured by an electrically conductive pin designated as a whole by the reference numeral 80. This pin 80 is preferably made in two parts 81, 82 for sandwiching one of lugs 20. It is advantageously a screw 81 and a counter-screw 82 able to be secured to each other. In the example of FIG. 3*a*, screw 81 is provided with a threaded end 81*a* arranged to pass through orifice 21 arranged in lug 20 and to be introduced into a corresponding internal screw threading 82*a* made in counter-screw 82. Lug 20 is thus sandwiched between a shoulder of screw 81 at the base of threading 81*a* and the end of counter-screw 82 consequently assuring electric contact with conductive plate 10. The electric contact with clasp element 60 is assured by application of the heads designated 81*b* and 82*b* of screw 81 and counter-screw 82.

By way of alternative to using a conductive pin 80 formed of two parts, one could envisage directly screwing screw 81 into lug 20 and not using a counter-screw 82, in which case the through orifice 51 could be not a through orifice. Making pin 80 in two parts for sandwiching lug 20 seems preferable however to assure proper electric contact with conductive plate 10 and clasp element 60.

It was already mentioned hereinbefore that wristband strand 50 could be cut to adjust the length roughly. This cutting operation is carried out, if necessary, when the electronic instrument is first tried on around the wrist. The appropriate length of the wristband is determined and the superfluous wristband length is cut along the appropriate marker 55 on the wristband. Clasp element 60 is then mounted by means of pin 80 at the appropriate position on the wristband.

Preferably, as already mentioned, the wristband includes two identical strands whose conductors are connected to each other by the wristband fastening device to form a loop conductor for operating like a loop antenna. Within the scope of such a use, it is preferable to ensure that the wristband fastening device is located at an equal distance from the case of the portable electronic instrument. This in fact minimises the effects of any contact of the fastening device with the user's skin on the operation and tuning of the antenna. This is also preferable from the point of view of comfort during wear. When the length of the wristband strands is roughly adjusted, care should thus be taken that the two wristband strands have substantially identical lengths after cutting.

Within the scope of use as an antenna, it will be noted that the fact of cutting a part of conductive plate 10 will affect the tuning of the antenna. Account must therefore be taken of this fact to tune the antenna at the desired frequency, which can be carried out directly by an appropriate tuning circuit in the radio-frequency receiver, which is connected to the antenna.

It will be understood that various modifications and improvements that are obvious to those skilled in the art can be made to the embodiment described in the present description without departing from the scope of the invention defined by the annexed claims. In particular, within the scope of the present invention, the electric contact zones with the conductive plate could be achieved differently than with lugs cut out and bent outside the plane of the conductive plate as illustrated. In order to implement the claimed invention, it is simply important for a plurality of electric contact zones to be arranged and distributed longitudinally over the wristband strand and for the wristband strand to be arranged so as to be able to be cut along several transverse lines located between each contact zone. The lug solution is, however, particularly advantageous because of its manufacturing simplicity. Further, as already mentioned, the invention is not limited to a wristband including a conductive plate acting as an antenna element but covers any solution requiring a conductor to be incorporated in a wristband.

What is claimed is:

1. A wristband for a portable electronic instrument including at least a first wristband strand including outer and inner faces and one end of which is intended to be fixed to a case of said portable electronic instrument, this first wristband strand including, housed between said outer and inner faces, an electric conductor including a conductive plate of elongated shape arranged longitudinally in said first wristband strand, wherein said electric conductor includes a plurality of electric contact zones with said conductive plate distributed longitudinally over said first wristband strand, said first wristband strand being arranged to be cut with said conductive plate along several transverse cutting lines arranged in each portion located between two adjacent electric contact zones.

2. A wristband according to claim 1, wherein at least one of said outer and inner faces of the first wristband strand is provided with transverse markers arranged on said cutting lines to facilitate the cutting of said first wristband strand.

3. A wristband according to claim 1, including a second wristband strand identical to the first wristband strand, said first and second wristband strands being attached to each other by a wristband fastening device assuring an electric connection between the conductive plates housed in said first and second wristband strands.

4. A wristband according to claim 2, including a second wristband strand identical to the first wristband strand, said first and second wristband strands being attached to each other by a wristband fastening device assuring an electric connection between the conductive plates housed in said first and second wristband strands.

5. A wristband according to claim 3, wherein said first and second strands have substantially identical lengths after cutting.

6. A wristband according to claim 1, wherein the other end of the first wristband strand is attached to a wristband fastening device, wherein said first wristband strand includes a plurality of orifices arranged transversely between said outer and inner faces of the wristband to access electrically said electric contact zones with said conductive plate, and wherein the wristband fastening device is electrically connected to one of said electric zones with said conductive plate via an electrically conductive pin housed in one of said orifices.

7. A wristband according to claim 3, wherein the other end of the first wristband strand is attached to a wristband fastening device, wherein said first wristband strand includes a plurality of orifices arranged transversely between said outer and inner faces of the wristband to access electrically said electric contact zones with said conductive plate, and wherein the wristband fastening device is electrically connected to one of said electric zones with said conductive plate via an electrically conductive pin housed in one of said orifices.

8. A wristband according to claim 5, wherein the other end of the first wristband strand is attached to a wristband fastening device, wherein said first wristband strand includes a plurality of orifices arranged transversely between said outer and inner faces of the wristband to access electrically said electric contact zones with said conductive plate, and wherein the wristband fastening device is electrically connected to one of said electric zones with said conductive plate via an electrically conductive pin housed in one of said orifices.

9. A wristband according to claim 6, wherein each electric contact zone with the conductive plate includes a lug cut into said conductive plate and bent along a longitudinal line in the direction of one of said outer and inner faces of the first wristband strand, each of said transverse orifices allowing electric access to a lug.

10. A wristband according to claim 7, wherein each electric contact zone with the conductive plate includes a lug cut into said conductive plate and bent along a longitudinal line in the direction of one of said outer and inner faces of the first wristband strand, each of said transverse orifices allowing electric access to a lug.

11. A wristband according to claim 8, wherein each electric contact zone with the conductive plate includes a lug cut into said conductive plate and bent along a longitudinal line in the direction of one of said outer and inner faces of the first wristband strand, each of said transverse orifices allowing electric access to a lug.

12. A wristband according to claim 9, wherein said transverse orifices are through orifices and wherein said electrically conductive pin includes a screw and a counter screw that sandwich one of said lugs.

13. A wristband according to claim 10, wherein said transverse orifices are through orifices and wherein said electrically conductive pin includes a screw and a counter screw that sandwich one of said lugs.

14. A wristband according to claim 11, wherein said transverse orifices are through orifices and wherein said electrically conductive pin includes a screw and a counter screw that sandwich one of said lugs.

15. A wristband according to claim 1, wherein said conductive plate forms an antenna element.

16. A wristband according to claim 2, wherein said conductive plate forms an antenna element.

17. A wristband according to claim 3, wherein said conductive plate forms an antenna element.

18. A wristband according to claim 6, wherein said conductive plate forms an antenna element.

19. A wristband according to claim 9, wherein said conductive plate forms an antenna element.

20. A wristband according to claim 12, wherein said conductive plate forms an antenna element.

* * * * *